United States Patent
Morita et al.

(10) Patent No.: US 10,634,792 B2
(45) Date of Patent: Apr. 28, 2020

(54) CONTROL DEVICE, WIRELESS COMMUNICATION DEVICE, AND POSITION ESTIMATION SYSTEM

(71) Applicant: Panasonic Intellectual Property Corporation of America, Torrance, CA (US)

(72) Inventors: Junichi Morita, Tokyo (JP); Naganori Shirakata, Kanagawa (JP); Hiroshi Takahashi, Kanagawa (JP); Kazuma Nishiyasu, Kanagawa (JP)

(73) Assignee: Panasonic Intellctual Property Corporation of America, Torrance, CA (US)

( * ) Notice: Subject to any disclaimer, the term of this patent is extended or adjusted under 35 U.S.C. 154(b) by 0 days.

(21) Appl. No.: 16/443,803

(22) Filed: Jun. 17, 2019

(65) Prior Publication Data

US 2019/0302267 A1    Oct. 3, 2019

Related U.S. Application Data

(63) Continuation of application No. PCT/JP2018/001513, filed on Jan. 19, 2018.

(30) Foreign Application Priority Data

Feb. 22, 2017    (JP) .................................. 2017-031025

(51) Int. Cl.
*G01C 3/08* (2006.01)
*G01S 17/89* (2020.01)
(Continued)

(52) U.S. Cl.
CPC ................ *G01S 17/89* (2013.01); *G01S 5/14* (2013.01); *G01S 17/06* (2013.01); *G01S 17/66* (2013.01);
(Continued)

(58) Field of Classification Search
None
See application file for complete search history.

(56) References Cited

U.S. PATENT DOCUMENTS 10,448,208 B2 * 10/2019 Mori ...................... H04W 8/186
10,484,953 B2 * 11/2019 Mori ................... H04W 52/262
(Continued)

FOREIGN PATENT DOCUMENTS

JP      2006-313111        11/2006

OTHER PUBLICATIONS

International Search Report of PCT application No. PCT/JP2018/001513 dated Mar. 20, 2018.

*Primary Examiner* — Isam A Alsomiri
*Assistant Examiner* — Amir J Askarian
(74) *Attorney, Agent, or Firm* — Seed IP Law Group LLP

(57) ABSTRACT

A control device includes a communication unit, a storage, and a position estimator. The position estimator updates a position of the first wireless communication device by using a difference between first reception quality and third reception quality and a difference between second reception quality and fourth reception quality. A first response signal includes at least the first reception quality calculated when a first control signal is received by the first wireless communication device and the second reception quality of a second response signal calculated when the second response signal is received by the first wireless communication device, and a third response signal includes at least the third reception quality of a third control signal and the fourth reception quality of a fourth response signal calculated when the fourth response signal is received by the first wireless communication device.

8 Claims, 12 Drawing Sheets

(51) Int. Cl.
    *H04B 17/318* (2015.01)
    *G01S 17/06* (2006.01)
    *G01S 17/66* (2006.01)
    *G06K 9/00* (2006.01)
    *G06T 7/20* (2017.01)
    *G01S 5/14* (2006.01)

(52) U.S. Cl.
    CPC ............ *G06K 9/00201* (2013.01); *G06T 7/20* (2013.01); *H04B 17/318* (2015.01)

(56) References Cited

U.S. PATENT DOCUMENTS

| | | | |
|---|---|---|---|
| 2007/0296633 A1* | 12/2007 | Yanagihara | G01S 5/0009 342/463 |
| 2015/0023395 A1* | 1/2015 | Tohyama | H04B 1/7156 375/134 |
| 2015/0373503 A1* | 12/2015 | Jovicic | G01S 5/0252 455/456.1 |
| 2017/0013663 A1* | 1/2017 | Bora | H04W 52/245 |
| 2017/0142323 A1* | 5/2017 | Saito | G03B 15/00 |
| 2019/0037575 A1* | 1/2019 | Sugaya | H04W 16/14 |
| 2019/0261306 A1* | 8/2019 | Park | G01S 5/0289 |
| 2019/0289692 A1* | 9/2019 | Morita | H05B 37/029 |

\* cited by examiner

FIG. 2

| RSSI CONCERNING MASTER DEVICE (RSSI_pi) | RSSI CONCERNING SLAVE DEVICE #1 (RSSI_1i) | RSSI CONCERNING SLAVE DEVICE #2 (RSSI_2i) | ... | RSSI CONCERNING SLAVE DEVICE #n (RSSI_ni) |

FIG. 3

| | RSSI CONCERNING MASTER DEVICE | RSSI CONCERNING SLAVE DEVICE #1 | RSSI CONCERNING SLAVE DEVICE #2 | ... | RSSI CONCERNING SLAVE DEVICE #n |
|---|---|---|---|---|---|
| SLAVE DEVICE IDENTIFIER (SLAVE DEVICE #1) | $RSSI\_p1$ | — | $RSSI\_21$ | ... | $RSSI\_n1$ |
| SLAVE DEVICE IDENTIFIER (SLAVE DEVICE #2) | $RSSI\_p2$ | $RSSI\_12$ | — | ... | $RSSI\_n2$ |
| ... | ... | ... | ... | — | ... |
| SLAVE DEVICE IDENTIFIER (SLAVE DEVICE #n) | $RSSI\_pn$ | $RSSI\_1n$ | $RSSI\_2n$ | ... | — |

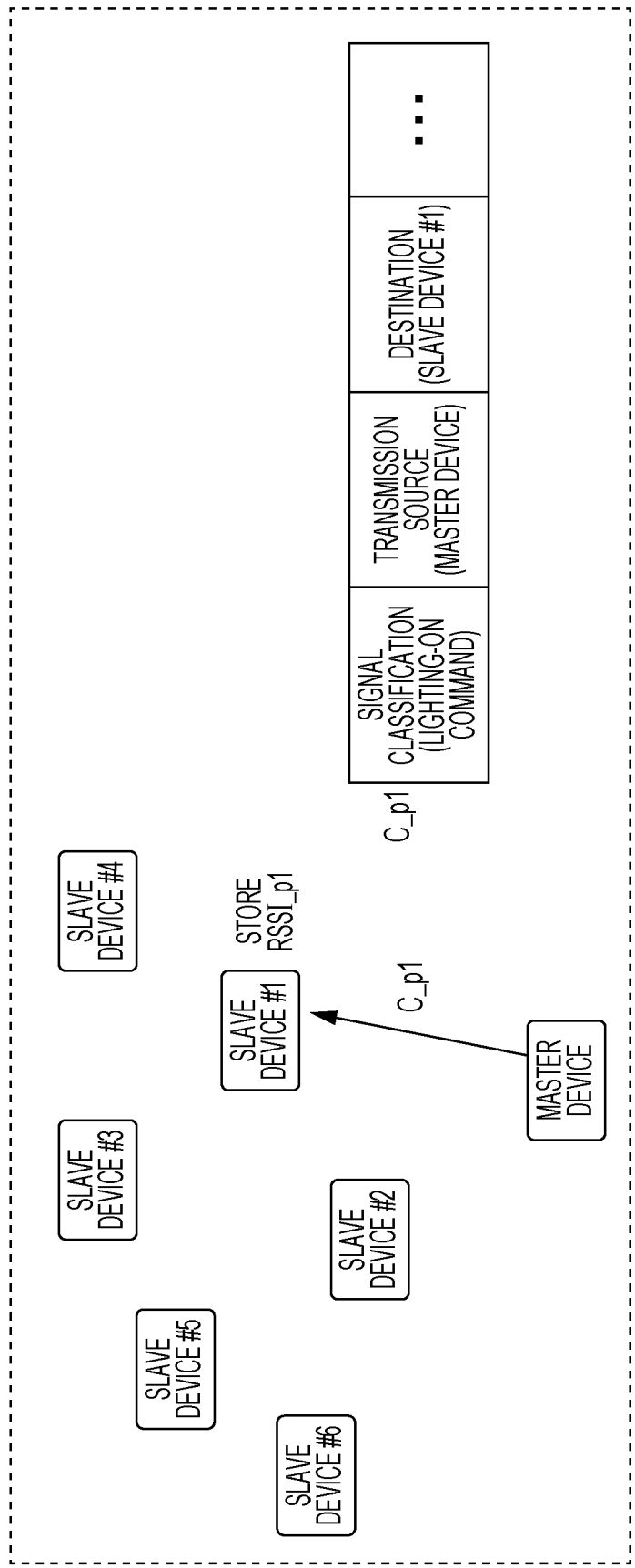

FIG. 5B

| SLAVE DEVICE IDENTIFIER (SLAVE DEVICE #1) | RSSI CONCERNING MASTER DEVICE (-60 dBm) | — | RSSI CONCERNING SLAVE DEVICE #2 (-55 dBm) | RSSI CONCERNING SLAVE DEVICE #3 (-55 dBm) | RSSI CONCERNING SLAVE DEVICE #4 (-55 dBm) |

| C_p1 | | |
|---|---|---|
| SIGNAL CLASSIFICATION (LIGHTING-ON) | TRANSMISSION SOURCE (MASTER DEVICE) | DESTINATION (SLAVE DEVICE #1) | ... |

| R_1p | | | | RSSI LIST | | | | | | | |
|---|---|---|---|---|---|---|---|---|---|---|---|
| SIGNAL CLASSIFICATION (LIGHTING-ON RESPONSE) | TRANSMISSION SOURCE (SLAVE DEVICE #1) | DESTINATION (MASTER DEVICE) | ... | RSSI CONCERNING MASTER DEVICE | | RSSI CONCERNING SLAVE DEVICE #2 | | RSSI CONCERNING SLAVE DEVICE #3 | | RSSI CONCERNING SLAVE DEVICE #4 | |
| | | | | RSSI DIRECTION (FROM MASTER DEVICE TO SLAVE DEVICE #1) | RSSI VALUE (-65 dBm) | RSSI DIRECTION (FROM SLAVE DEVICE #2 TO SLAVE DEVICE #1) | RSSI VALUE (-55 dBm) | RSSI DIRECTION (FROM SLAVE DEVICE #3 TO SLAVE DEVICE #1) | RSSI VALUE (-50 dBm) | RSSI DIRECTION (FROM SLAVE DEVICE #4 TO SLAVE DEVICE) | RSSI VALUE (-55 dBm) |

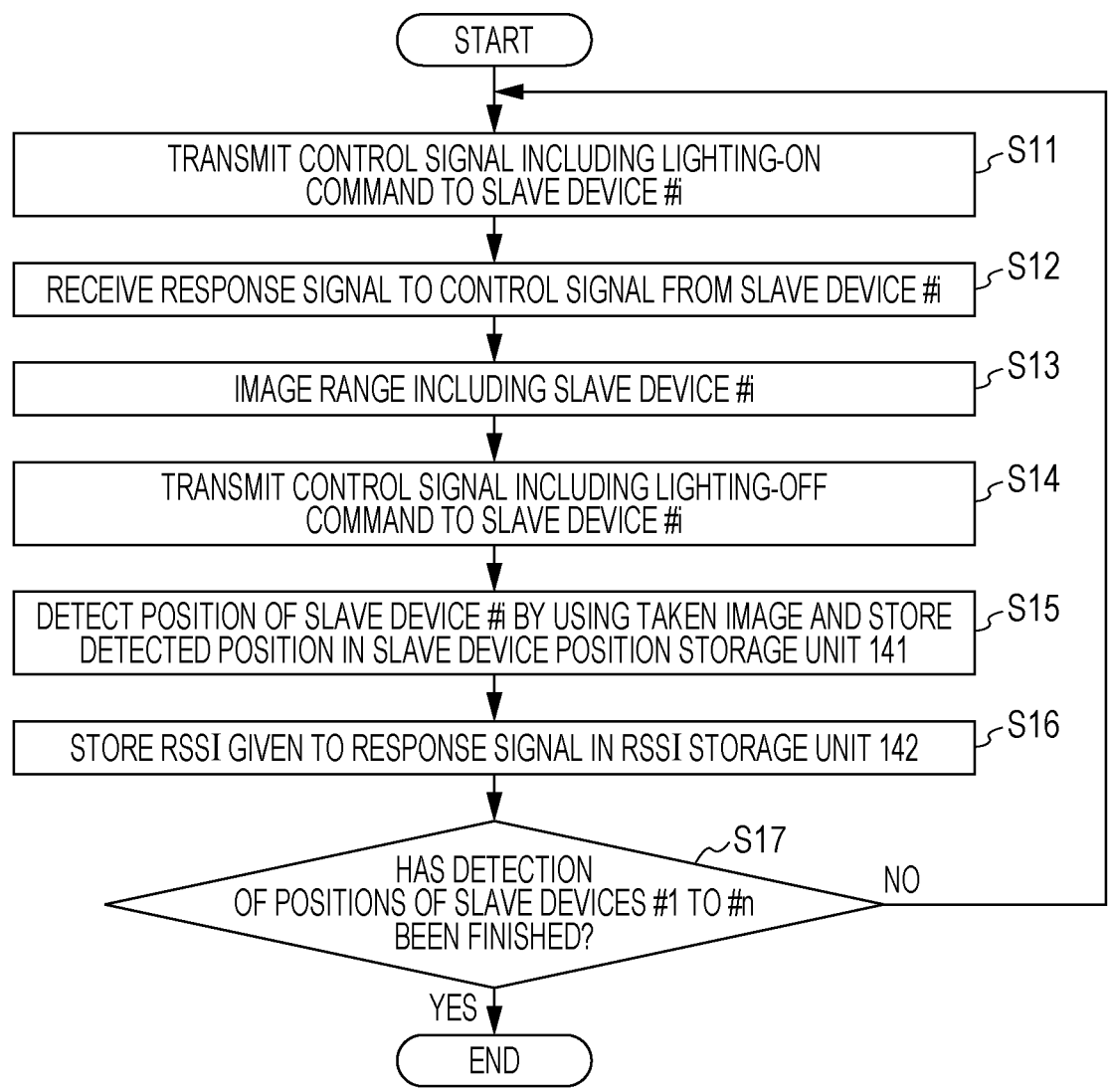

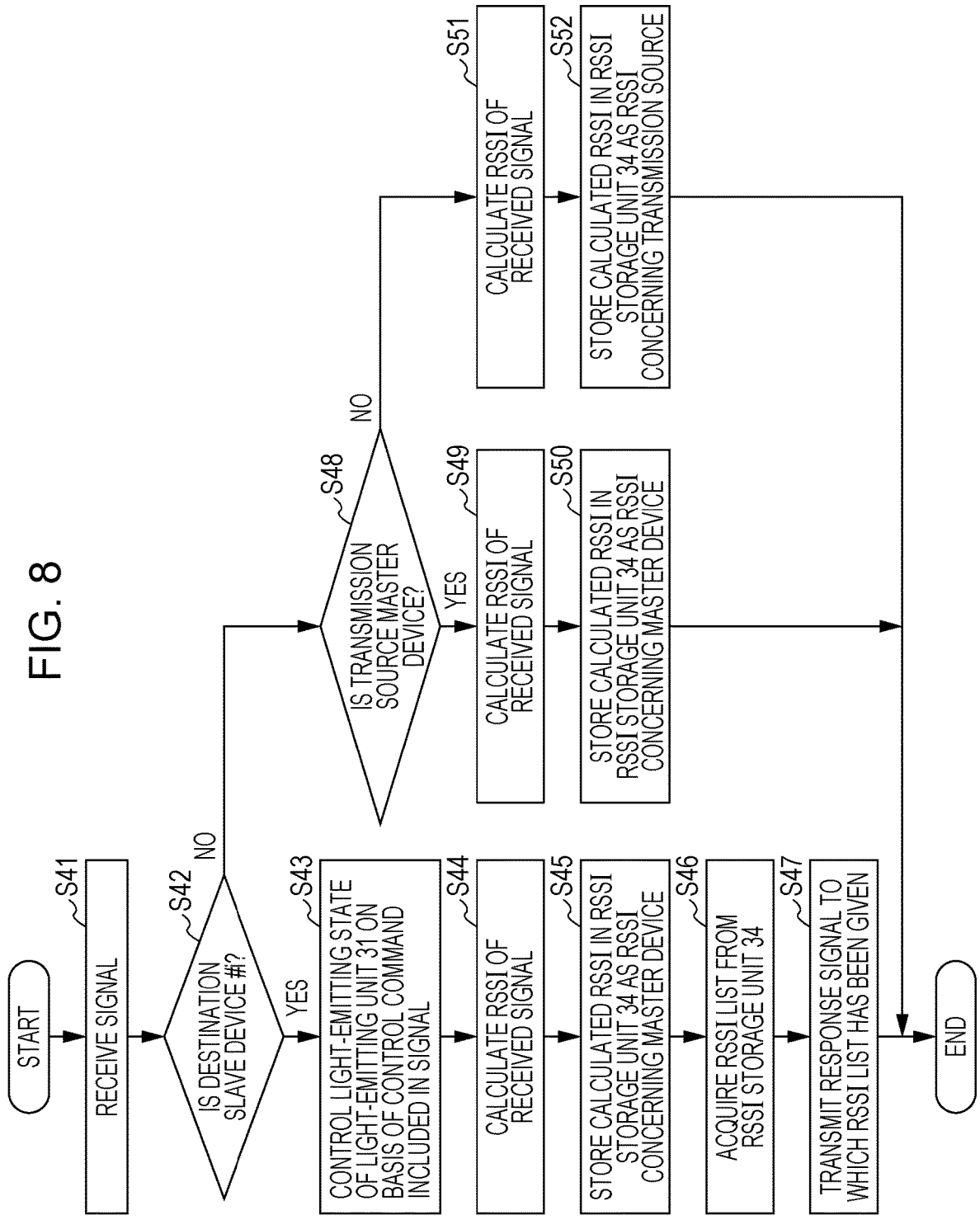

CONTROL DEVICE, WIRELESS COMMUNICATION DEVICE, AND POSITION ESTIMATION SYSTEM

BACKGROUND

1. Technical Field

The present disclosure relates to a control device, a wireless communication device, and a position estimation system.

2. Description of the Related Art

In recent years, in facilities, such as stadiums and halls, that accommodate a large audience, a whole of or a part of a region where light-emitting devices (wireless communication devices), such as penlights or bracelets that can be wirelessly controlled, possessed by the audience are lined up (i.e., an area where the audience is lined up) is used as a performance area for stage effects such as formation of characters and a color change by controlling ON or OFF of the light-emitting devices with the use of a control device. Hereinafter, such a performance is referred to as a "mass performance".

For a mass performance, the control device individually gives each of the light-emitting devices a command to change a light-emitting state such as lighting ON or OFF in accordance with a position of the light-emitting device. For this purpose, the control device detects a position of each of the light-emitting devices.

For example, Japanese Unexamined Patent Application Publication No. 2006-313111 (hereinafter referred to as Patent Literature 1) discloses a position measurement system that detects a position of an identification information sending device such as a wireless tag having a light-emitting unit.

SUMMARY

However, the position measurement system disclosed in Patent Literature 1 is a position measurement system that turns on the light-emitting unit in order to detect the position and is therefore hard to apply to detection of a position of a light-emitting device whose light-emitting state is changed in a mass performance.

One non-limiting and exemplary embodiment provides a control device, a wireless communication device, and a position estimation system that can estimate a position of a light-emitting device (wireless communication device) whose light-emitting state is changed in a mass performance.

In one general aspect, the techniques disclosed here feature a control device including: a communication unit that transmits a first control signal for designating a first light-emitting state of first to n-th wireless communication devices to the first wireless communication device on a basis of a position of the first wireless communication device and transmits a second control signal for designating the first light-emitting state of the first to n-th wireless communication devices to the second wireless communication device on a basis of a position of the second wireless communication device, n being an integer of 2 or more, transmits a third control signal for designating a second light-emitting state of the first to n-th wireless communication devices to the first wireless communication device on a basis of the position of the first wireless communication device and transmits a fourth control signal for designating the second light-emitting state of the first to n-th wireless communication devices to the second wireless communication device on a basis of the position of the second wireless communication device after transmission of the first control signal and the second control signal, receives a first response signal to the first control signal from the first wireless communication device and receives a third response signal to the third control signal from the first wireless communication device after reception of the first response signal, receives a second response signal to the second control signal from the second wireless communication device and receives a fourth response signal to the fourth control signal from the second wireless communication device after reception of the second response signal; a storage in which positions of the first to n-th wireless communication devices, the first response signal, and the second response signal are stored; and a position estimator that updates the position of the first wireless communication device by using the first response signal and the third response signal, wherein the first response signal includes at least first reception quality calculated when the first control signal is received by the first wireless communication device and second reception quality of the second response signal calculated when the second response signal is received by the first wireless communication device, wherein the third response signal includes at least third reception quality calculated when the third control signal is received by the first wireless communication device and fourth reception quality of the fourth response signal calculated when the fourth response signal is received by the first wireless communication device, and wherein the position estimator updates the position of the first wireless communication device by using a difference between the first reception quality and the third reception quality and a difference between the second reception quality and the fourth reception quality.

The aspect of the present disclosure contributes to estimation of a position of a light-emitting device (wireless communication device) whose light-emitting state is changed in a mass performance.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 illustrates an example of an RSSI list stored in an RSSI storage unit of a slave device;

FIG. 3 illustrates an example of an RSSI table stored in an RSSI storage unit of a control device;

FIG. 4A illustrates a processing process in which a slave device receives a control signal transmitted by a master device;

FIG. 5B illustrates RSSIs before execution of the mass performance;

FIG. 5D illustrates RSSIs during execution of the mass performance;

FIG. 6 is a flowchart illustrating a processing flow of an initial position detection method according to the embodiment of the present disclosure;

FIG. 8 is a flowchart illustrating a processing flow of a slave device according to the embodiment of the present disclosure.

DETAILED DESCRIPTION

Figure 1:
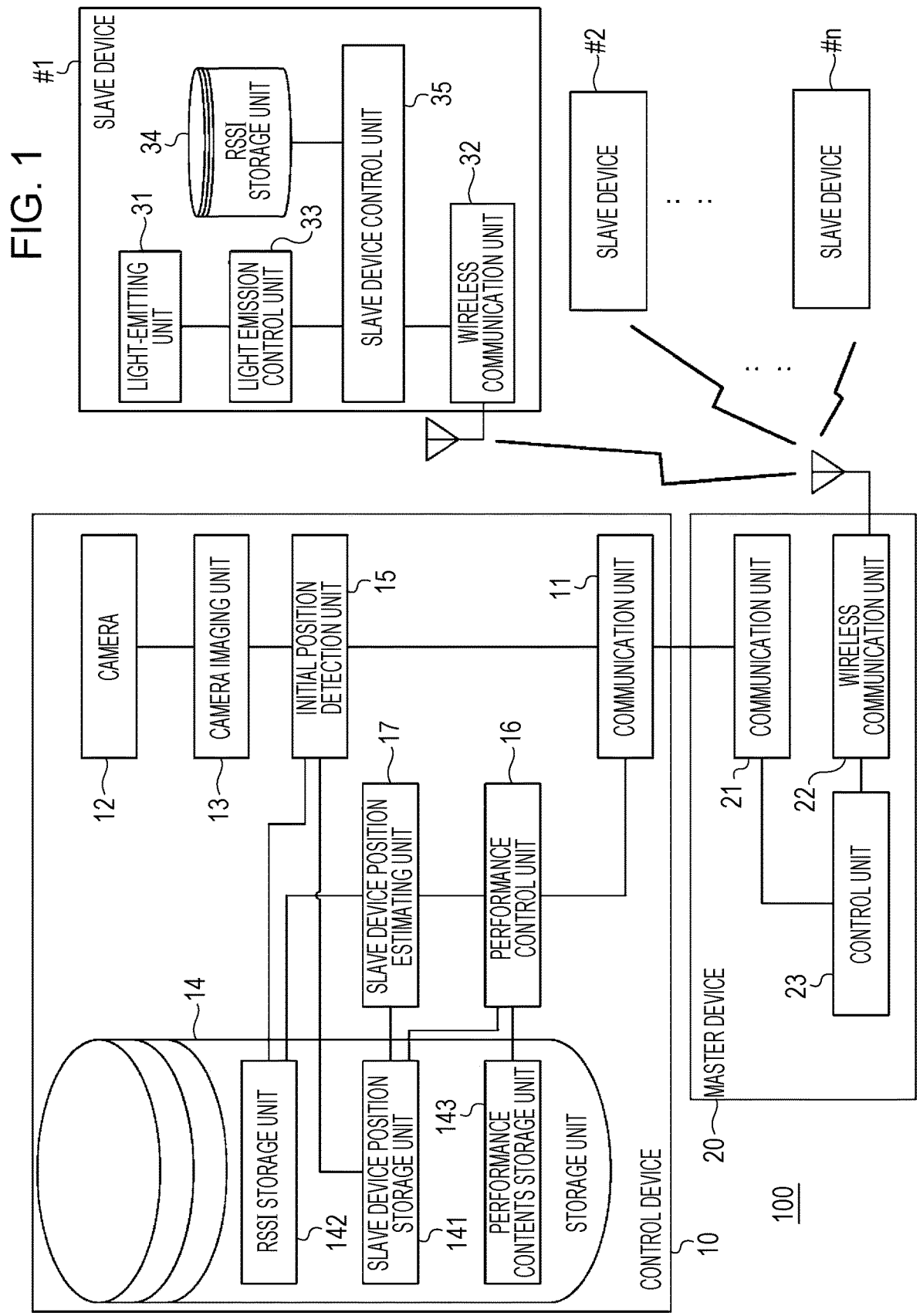
FIG. 1 is a diagram illustrating an example of a system configuration of a control system according to an embodiment of the present disclosure.

First, the position measurement system disclosed in Patent Literature 1 is described.

The position measurement system described in Patent Literature 1 includes an identification information sending device that includes a unit for sending a radio signal including identification information and a light-emitting unit, a receiving device that receives the radio signal, an imaging device that records, as an image, an area where the identification information sending device is present, and a position measurement device connected to the receiving device and the imaging device.

The imaging device and the receiving device are provided close to each other and are disposed in an almost same direction relative to the identification information sending device. The imaging device successively images an area to be imaged and transmits data of the taken images to the position measurement device. The position measurement device records the received data of the taken images in association with a time of the receipt.

In the position measurement system disclosed in Patent Literature 1, coordinates of an image taken by the imaging device and coordinates of a target of position measurement are associated with each other in advance. Accordingly, by detecting coordinates of the light-emitting unit on the taken image, the position measurement device can detect a position of the identification information sending device, i.e., absolute coordinates from the detected coordinates of the light-emitting unit on the basis of information concerning the coordinate association.

In a case where the identification information sending device causes the light-emitting unit to emit light, the identification information sending device sends a radio signal including identification information to the receiving device. The receiving device receives the identification information, calculates a received signal strength indicator (RSSI) at a time of the receipt, and transmits the identification information and the RSSI to the position measurement device. The position measurement device extracts images taken around a time of the receipt of the identification information and the RSSI by referring to the time of the receipt of the identification information and the RSSI.

In a case where a taken image includes a plurality of light-emitting units, the position measurement device specifies each of the plurality of light-emitting units, i.e., each of a plurality of identification information sending devices by associating a difference in brightness and a difference in RSSI. Specifically, the position measurement device specifies positions of the light-emitting units, i.e., positions of the identification information sending devices by determining that as brightness of a light-emitting unit becomes weaker, the light-emitting unit becomes farther away from the imaging device (and the receiving device provided close to the imaging device) and therefore the RSSI also becomes weaker.

However, the position measurement system disclosed in Patent Literature 1 is a position measurement system that turns on the light-emitting unit in order to detect a position and is therefore hard to apply to detection of a position of a light-emitting device whose light-emitting state is changed for a mass performance. That is, in a case where a lighting OFF state need be kept, it is hard to use the position measurement system disclosed in Patent Literature 1.

In the position measurement system disclosed in Patent Literature 1, it is required that the imaging device and the receiving device be disposed in an almost same direction relative to the identification information sending device, i.e., it is required that a plurality of light-emitting units (identification information sending devices) be different in terms of brightness and RSSI. Therefore, in the position measurement system disclosed in Patent Literature 1, for example, it is hard to specify positions of a plurality of light-emitting units (identification information sending devices) that exist at equal distance from the imaging device and the receiving device and are substantially equal to one another in terms of brightness and RSSI.

The present disclosure was accomplished in view of the above points. The present disclosure was attained on the basis of finding that a position of a light-emitting device whose light-emitting state is controlled for a mass performance and that is hard to turn on for detection of the position can be estimated on the basis of reception quality indicative of a positional relationship between light-emitting devices that is calculated by the light-emitting device that received a signal transmitted from another light-emitting device.

An embodiment of the present disclosure is described in detail below with reference to the drawings. The embodiment described below is an example, and the present disclosure is not limited to the embodiment below.

Embodiment

FIG. 1 is a diagram illustrating an example of a system configuration of a control system 100 according to the present embodiment. In FIG. 1, the control system 100 includes a control device 10, a master device (wireless base station device) 20, and n slave devices (wireless communication devices) (n is an integer of 2 or more) (slave devices #1 to # n). The control system 100 is a system provided in a facility, such as a stadium or a hall, that accommodates a large audience and estimates positions of the slave devices #1 to # n and executes a mass performance on the basis of the estimated positions. In FIG. 1, the control system 100 corresponds to a position estimation system according to the present disclosure.

The control device 10 is connected to the master device 20 via a network such as a wired local area network (LAN) and performs overall control of the control system 100. The control device 10 is, for example, a personal computer (PC). The control device 10 and the master device 20 may be separate from each other or may be integral with each other.

The control device 10 includes a communication unit 11, a camera 12, a camera imaging unit 13, a storage unit 14, an initial position detection unit 15, a performance control unit 16, and a slave device position estimating unit 17.

The communication unit 11 is, for example, a communication interface of the wired LAN. The communication unit 11 performs, for example, processing for transmitting a signal to the master device 20 and processing for receiving a signal from the master device 20.

The camera 12 images an area where the slave devices #1 to # n are present under control of the camera imaging unit 13 that will be described later and supplies a taken image to the camera imaging unit 13. The camera 12 is fixedly provided at a position at which the camera 12 can image a range (moving range) in which the slave devices #1 to # n are movable. For example, in a case where the control system 100 is provided in a facility that accommodates a large audience, the moving range of the slave devices #1 to # n is a range where spectators' seats of the facility are provided.

Coordinates on the taken image and absolute coordinates in the moving range of the slave devices #1 to # n based on the master device 20 are associated with each other in advance.

In a case where the moving range of the slave devices #1 to # n is wide, a plurality of cameras 12 may be provided. The plurality of cameras 12 are provided so that imaging ranges of the cameras 12 encompass the whole moving range of the slave devices #1 to # n.

Although an example in which the camera 12 is included in the control device 10 is described in the present embodiment, the camera 12 may be provided separately from the control device 10 and connected to the control device 10 via a wired or wireless network.

The camera imaging unit 13 controls an imaging timing of the camera 12. The camera imaging unit 13 acquires a taken image from the camera 12.

The storage unit 14 is, for example, a hard disc drive (HDD) or a memory card and is at least one storage device in which various kinds of data are stored. Specifically, the storage unit 14 includes a slave device position storage unit 141, an RSSI storage unit 142, and a performance contents storage unit 143.

The slave device position storage unit 141 stores therein current positions of the slave devices #1 to # n. The current positions are positions detected by the initial position detection unit 15 that will be described later or positions estimated by the slave device position estimating unit 17 that will be described later.

The RSSI storage unit 142 stores therein, in a table format, an RSSI that is reception quality of a signal received by each of the slave devices (e.g., the slave device #1) in association with an identifier of the slave device and a transmission source of the received signal.

The table (RSSI table) of RSSIs stored in the RSSI storage unit 142 will be described later.

The performance contents storage unit 143 stores therein an image (e.g., a still image or a moving image) of a performance using the slave devices #1 to # n. The image is generated by differences in light-emitting state among light-emitting units of the slave devices #1 to # n.

The initial position detection unit 15 detects initial positions of the slave devices #1 to # n. The initial positions are positions of the slave devices #1 to # n before execution of a mass performance.

Specifically, the initial position detection unit 15 transmits, to any one (hereinafter referred to as a designated slave device or a designated wireless communication device) of the slave devices #1 to # n, a control signal including a command (lighting-on command) for causing the slave device to turn on a light through the communication unit 11. Upon receipt of a response signal to the control signal from the designated slave device, the initial position detection unit 15 gives the camera imaging unit 13 a command to perform imaging. After acquiring a taken image from the camera imaging unit 13, the initial position detection unit 15 transmits, to the designated slave device, a control signal including a command (lighting-off command) for causing the designated slave device to turn off the light.

Next, the initial position detection unit 15 detects a lighting position by performing image processing of the taken image. Then, the initial position detection unit 15 detects a position of the designated slave device on the basis of the lighting position on the taken image and the correspondences between the coordinates on the taken image and the absolute coordinates and causes the detected position of the designated slave device to be stored in the slave device position storage unit 141.

Furthermore, the initial position detection unit 15 causes an RSSI list added to the response signal to be stored in the RSSI storage unit 142.

The processing for detecting initial positions in the initial position detection unit 15 will be described later.

The performance control unit 16 decides light-emitting states of the slave devices #1 to # n on the basis of the image acquired from the performance contents storage unit 143 and positional information of the slave devices #1 to # n acquired from the slave device position storage unit 141. Then, the performance control unit 16 generates a control signal including a command (control command) designating a light-emitting state of each of the slave devices #1 to # n and transmits the control signal to each of the slave devices #1 to # n through the communication unit 11. A light-emitting state of a slave device is, for example, a lighting-on state or a lighting-off state. Note that a light-emitting state of a slave device may include, for example, a color or brightness of lighting.

The performance control unit 16 receives a response signal to the control signal including the control command from each of the slave devices #1 to # n through the communication unit 11. The performance control unit 16 supplies the received response signal to the slave device position estimating unit 17.

The slave device position estimating unit 17 extracts an RSSI list of each slave device given to the response signal acquired from the performance control unit 16. Then, the slave device position estimating unit 17 estimates a position of each slave device by comparing the RSSI table acquired from the RSSI storage unit 142 and the extracted RSSI list.

Specifically, the slave device position estimating unit 17 estimates a direction and a distance of movement of a slave device on the basis of a difference between an RSSI in the RSSI table and an RSSI in the RSSI list. Then, the slave device position estimating unit 17 updates the position of the slave device by adding the estimates direction and distance to the position stored in the slave device position storage unit 141 and causes the updated position to be stored in the slave device position storage unit 141. Furthermore, the slave device position estimating unit 17 causes the RSSI list to be stored in the RSSI storage unit 142. By storing the RSSI list, the RSSI table is updated.

A method for estimating a position of a slave device in the slave device position estimating unit 17 will be described later.

The master device 20 is connected to the control device 10 via the wired LAN. The master device 20 is wirelessly connected to the slave devices #1 to # n. The master device 20 is, for example, an access point that supports a 2.4 GHz wireless LAN.

The master device 20 includes, for example, a communication unit 21, a wireless communication unit 22, and a control unit 23.

The communication unit 21 is, for example, a communication interface of the wired LAN. The communication unit 21 performs, for example, processing for transmitting a signal to the control device 10 and processing for receiving a signal from the control device 10.

The wireless communication unit 22 is, for example, a communication interface of the 2.4 GHz wireless LAN. The wireless communication unit 22 performs, for example, processing for transmitting a signal to the slave devices #1 to # n and processing for receiving a signal from the slave devices #1 to # n.

The control unit 23 controls, for example, communication with the control device 10 through the communication unit 21 and communication with the slave devices #1 to # n through the wireless communication unit 22.

The slave devices #1 to # n communicate with the control device 10 through the master device 20 wirelessly connected to the slave devices #1 to # n. The slave devices #1 to # n are, for example, penlights or bracelets that can be wirelessly controlled and are possessed by an audience. The slave devices #1 to # n have similar configurations, and therefore a configuration of each of the slave devices #1 to # n is described by taking the slave device #1 as an example.

The slave device #1 includes a light-emitting unit 31, a wireless communication unit 32, a light emission control unit 33, an RSSI storage unit 34, and a slave device control unit 35.

The light-emitting unit 31 is a device that includes at least one light emitting diode (LED) light and is switched between a lighting-on state and a lighting-off state and changes a color of lighting to a designated color.

The wireless communication unit 32 is, for example, a communication interface of the 2.4 GHz wireless LAN. The wireless communication unit 32 performs, for example, processing for transmitting a signal to the master device 20 and processing for receiving a signal from the master device 20 or other slave devices (the slave devices #2 to # n). For example, the wireless communication unit 32 receives a control signal including a lighting-on command, a lighting-off command, a control command, or the like from the master device 20. Furthermore, the wireless communication unit 32 receives a response signal transmitted to the master device 20 by other slave devices (the slave devices #2 to # n).

The light emission control unit 33 switches the lighting-on state and the lighting-off state of the light-emitting unit 31 and changes a color of lighting to a designated color on the basis of a command (a lighting-on command, a lighting-off command, and a control command) acquired from the slave device control unit 35 that will be described later.

The RSSI storage unit 34 stores therein an RSSI calculated when a signal transmitted from the master device 20 is received and an RSSI calculated when a signal transmitted from a slave device (the slave devices #2 to # n) other than the slave device #1 is received.

A list of RSSIs (RSSI list) stored in the RSSI storage unit 34 will be described later.

The slave device control unit 35 performs processing for transmitting and receiving a signal through the wireless communication unit 32 and processing for calculating an RSSI of a received signal.

The slave device control unit 35 recognizes a transmission source and a destination of a signal received by the wireless communication unit 32. In a case where a transmission source of a signal received by the wireless communication unit 32 is the control device 10 and a destination of the received signal is the slave device #1, the slave device control unit 35 extracts a controls signal (e.g., a lighting-on command, a lighting-off command, or a control command) included in the received signal, supplies the control signal to the light emission control unit 33, and generates a response signal to the control signal. The slave device control unit 35 gives the RSSI list stored in the RSSI storage unit 34 to the response signal.

Furthermore, the slave device control unit 35 calculates an RSSI of a received signal. Then, the slave device control unit 35 causes an RSSI with which a transmission source of the received signal is associated to be stored as an RSSI list in the RSSI storage unit 34.

In the system described above, the control device 10 estimates positions of the slave devices #1 to # n and executes a mass performance on the basis of the estimated positions. Hereinafter, for convenience of description, the master device 20 is referred to as a master device.

Next, an example of an RSSI list stored in the RSSI storage unit 34 is described with reference to FIG. 2. FIG. 2 illustrates an example of an RSSI list stored in the RSSI storage unit 34 of a slave device # i (i is an integer that is not less than 1 and not more than n).

An "RSSI concerning master device" in the RSSI list illustrated in FIG. 2 is an RSSI calculated when a signal transmitted by the master device is received by the slave device # i. In the RSSI list, RSSI_pi is stored as a value of the RSSI concerning the master device.

The "signal transmitted by the master device" is a signal transmitted to the slave device # i through the master device by the control device 10. Note that the "signal transmitted by the master device" may be a signal transmitted to a slave device # j through the master device by the control device 10.

An "RSSI concerning the slave device #1" is an RSSI calculated when a signal transmitted to the master device by the slave device #1 is received by the slave device # i. In the RSSI list, an RSSI_1$i$ is stored as a value of the RSSI concerning the slave device #1.

The "signal transmitted by the slave device #1" is, for example, a response signal transmitted to the master device by the slave device #1 in response to a control signal transmitted to the slave device #1.

Similarly, an "RSSI concerning a slave device # j (j is an integer that is not less than 1 and not more than n and is different from i)" is an RSSI calculated when a signal transmitted to the master device by the slave device # j is received by the slave device # i. In the RSSI list, RSSI_ji is stored as a value of an RSSI concerning the slave device # j.

As described above, the slave device control unit 35 of the slave device # i receives a signal transmitted to a slave device # j or the slave device # i by the master device and a signal transmitted to the master device by a slave device # j and calculates RSSIs of the received signals. Then, the slave device control unit 35 causes the RSSIs with which transmission sources of the received signals to be stored as an RSSI list in the RSSI storage unit 34. Furthermore, the slave device control unit 35 gives the RSSI list illustrated in FIG. 2 to a response signal transmitted to the master device.

An RSSI concerning each device (the master device or a slave device) may be associated with a direction (an RSSI direction) of a signal for which the RSSI has been calculated (not illustrated in FIG. 2). For example, an RSSI calculated when a signal transmitted by the master device is received by the slave device # i may be associated with information on a direction from the master device to the slave device # i as an RSSI direction of the RSSI.

Next, an example of the RSSI table stored in the RSSI storage unit 142 is described with reference to FIG. 3. FIG. 3 illustrates an example of the RSSI table stored in the RSSI storage unit 142 of the control device 10.

In FIG. 3, a slave device identifier and an RSSI list included in a response signal received by corresponding slave device are associated in the RSSI table.

For example, an "RSSI concerning master device" associated with a "slave device identifier (slave device #1)" indicative of the slave device #1 is an RSSI calculated when a signal transmitted by the master device is received by the slave device #1. In the RSSI table, RSSI_p1 is stored as a value of the RSSI concerning the master device.

An "RSSI concerning slave device #2" associated with the "slave device identifier (slave device #1)" indicative of the slave device #1 is an RSSI calculated when a signal transmitted by the slave device #2 is received by the slave device #1. In the RSSI table, RSSI_1$i$ is stored as a value of the RSSI concerning the slave device #2.

An "RSSI concerning the slave device #1" that is associated with the "slave device identifier (slave device #1)" indicative of the slave device #1 is not calculated and is therefore blank.

The RSSI table illustrated in FIG. 3 is read out in a case where the slave device position estimating unit 17 estimates a position of a slave device. The RSSI table illustrated in FIG. 3 is updated by using a latest RSSI list acquired from a response signal in a process of estimation processing after a position of a slave device is estimated by the slave device position estimating unit 17.

As described above with reference to FIGS. 2 and 3, an RSSI of a signal received by each slave device is stored as an RSSI list in the RSSI storage unit 34 of the slave device. In the RSSI storage unit 142 of the control device 10, an RSSI list given to a response signal transmitted from each slave device is stored in the RSSI table in association with the slave device that has transmitted the response signal.

Figure 4B:
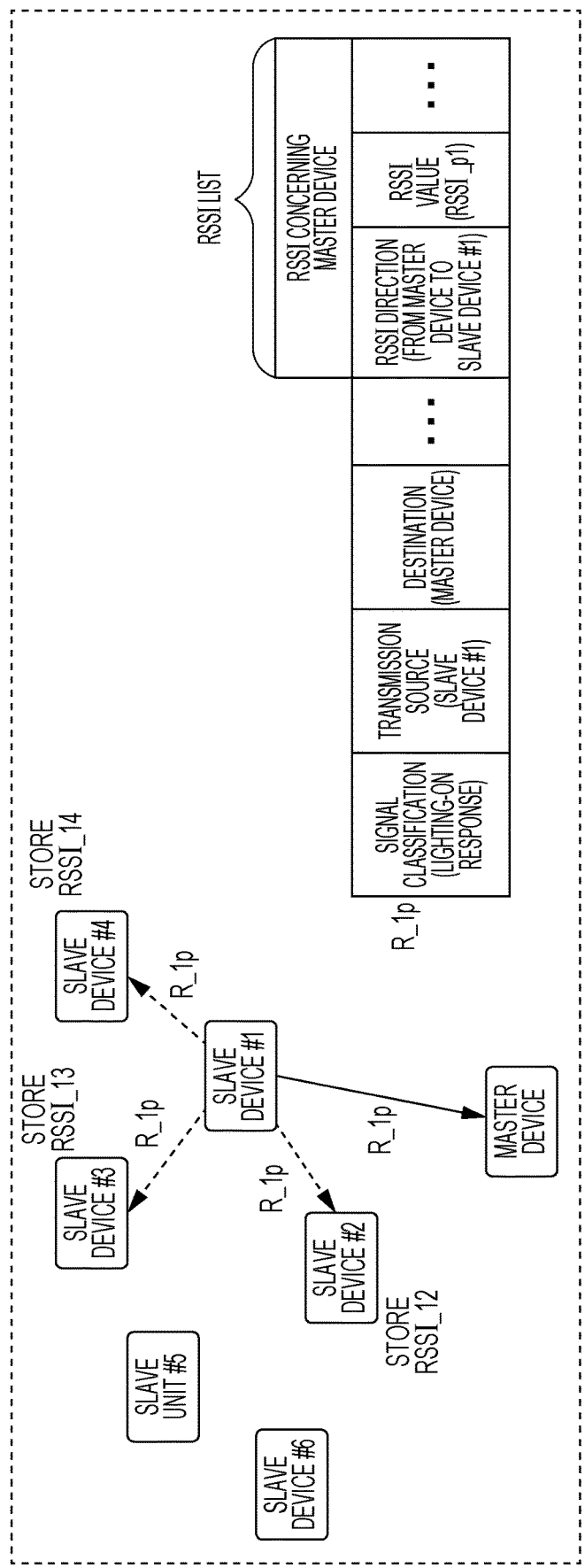
FIG. 4B illustrates a processing process in which a slave device that has received the control signal in FIG. 4A transmits a response signal.

Next, processing of the slave device #1 and other slave devices in a process in which the slave device #1 receives a control signal from the master device and transmits a response signal in response to the control signal is described with reference to FIGS. 4A and 4B. FIG. 4A illustrates a processing step in which a control signal transmitted by the master device is received by the slave device #1. FIG. 4B illustrates a processing step in which the slave device #1 that has received the control signal in FIG. 4A transmits a response signal. The master device and the slave devices #1 to #6 are illustrated in FIGS. 4A and 4B. FIGS. 4A and 4B illustrate an example of a signal that is transmitted and received.

In FIG. 4A, the master device transmits a control signal C_p1 including a lighting-on command to the slave device #1. A signal classification of the control signal C_p1 is a lighting-on command, a transmission source of the control signal C_p1 is the master device, and a destination of the control signal C_p1 is the slave device #1. The control signal C_p1 may include information other than a signal classification, a transmission source, and a destination, but description thereof is omitted.

The slave device #1 receives the control signal C_p1 and calculates an RSSI of the control signal C_p1. Then, the slave device #1 causes the calculated RSSI of the control signal C_p1 to be stored as an RSSI (RSSI_p1) concerning the master device. Then, the slave device #1 transmits a response signal R_1$p$ to the master device.

In FIG. 4B, the slave device #1 transmits the response signal R_1$p$ to the master device in response to the control signal C_p1. A signal classification of the response signal R_1$p$ is a response (a lighting-on response) to a lighting-on command, a transmission source of the response signal R_1$p$ is the slave device #1, and a destination of the response signal R_1$p$ is the master device. The response signal R_1$p$ may include information other than a signal classification, a transmission source, a destination, and an RSSI list, but description thereof is omitted.

In a case where the slave device #1 transmits the response signal R_1$p$, for example, by using a non-directional transmission beam, the slave device #2 around the slave device #1 receives the response signal R_1p. The slave device #2 recognizes that a destination of the received response signal R_1$p$ is the master device, i.e., the destination of the received response signal R_1$p$ is not the slave device #2 and that a transmission source of the received response signal R_1$p$ is the slave device #1. Furthermore, the slave device #2 calculates an RSSI of the received response signal R_1$p$ and causes the calculated RSSI to be stored as an RSSI (RSSI_12) concerning the slave device #1 in the RSSI storage unit 34 of the slave device #2.

The slave device #3 also recognizes that the destination of the received response signal R_1$p$ is the master device, i.e., the destination of the received response signal R_1$p$ is not the slave device #3 and that the transmission source of the received response signal R_1$p$ is the slave device #1. Furthermore, the slave device #3 calculates an RSSI of the received response signal R_1$p$ and causes the calculated RSSI to be stored as an RSSI (RSSI_13) concerning the slave device #1 in the RSSI storage unit 34 of the slave device #3.

The slave device #4 also recognizes that the destination of the received response signal R_1$p$ is the master device, i.e., the destination of the received response signal R_1$p$ is not the slave device #4 and that the transmission source of the received response signal R_1$p$ is the slave device #1. Furthermore, the slave device #4 calculates an RSSI of the received response signal R_1$p$ and causes the calculated RSSI to be stored as an RSSI (RSSI_14) concerning the slave device #1 in the RSSI storage unit 34 of the slave device #4.

In FIG. 4A, the master device transmits a control signal to each slave device, and therefore a slave device that has received a control signal can calculate an RSSI concerning the master device. In FIG. 4B, a slave device that has received a control signal transmits a response signal to the master device, and therefore a slave device present around the slave device that has transmitted the response signal can calculate an RSSI concerning the slave device that has transmitted the response signal.

For example, in a case where the slave device #2 receives the control signal C_p1 in FIG. 4A, the slave device #2 may calculate an RSSI of the control signal C_p1 and cause the calculated RSSI to be stored (not illustrated). In this case, the slave device #2 recognizes that the destination of the received control signal C_p1 is the slave device #1, i.e., the destination of the received control signal C_p1 is not the slave device #2 and that the transmission source of the received control signal C_p1 is the master device, calculates the RSSI of the received control signal C_p1, and causes the calculated RSSI to be stored as an RSSI (RSSI_p2) concerning the master device in the RSSI storage unit 34 of the slave device #2.

Figure 5A:
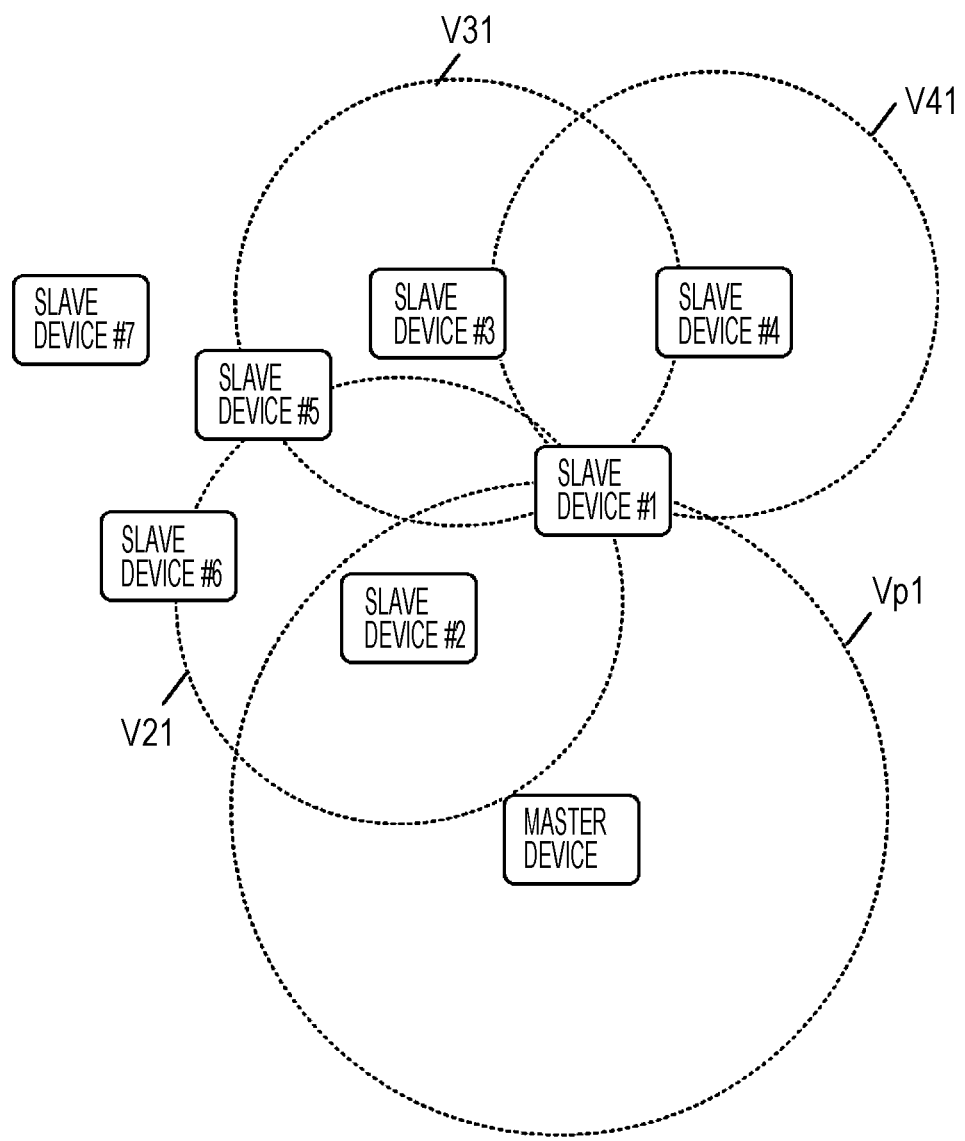
FIG. 5A illustrates initial positions of a plurality of slave devices before execution of a mass performance.
Figure 5C:
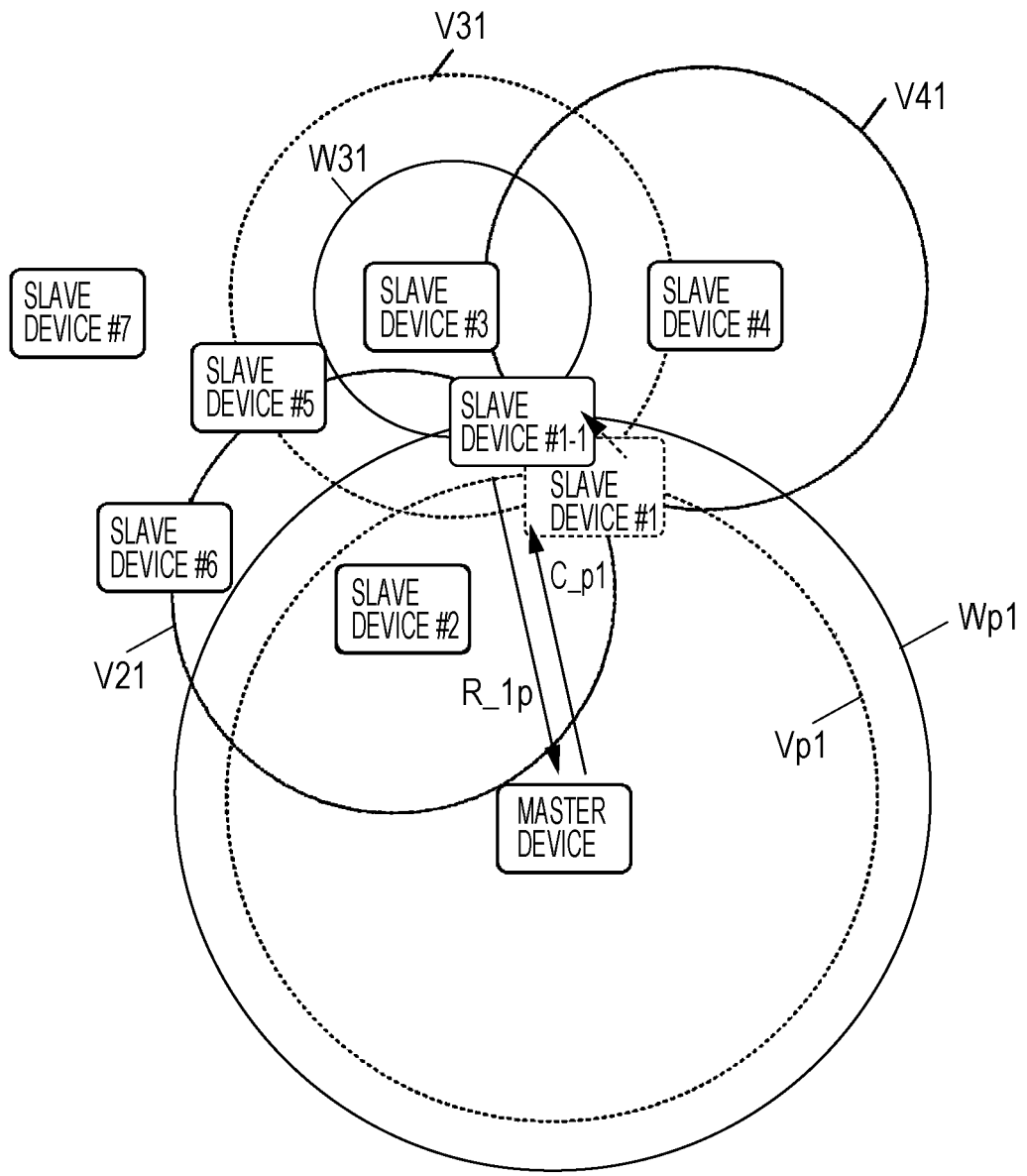
FIG. 5C illustrates positions of the plurality of slave devices during execution of the mass performance.

Next, an example of processing for estimating a position of a slave device in the slave device position estimating unit 17 is described with reference to FIGS. 5A, 5B, 5C, and 5D. FIG. 5A illustrates initial positions of a plurality of slave devices before execution of a mass performance. FIG. 5B illustrates RSSIs before execution of the mass performance. FIG. 5C illustrates positions of the plurality of slave devices during execution of the mass performance. FIG. 5D illustrates RSSIs during execution of the mass performance. The master device and the slave devices #1 to #7 are illustrated in FIGS. 5A and 5C. The following describes, as an example, processing for estimating a position of the slave device #1 that moves during execution of a mass performance. The initial positions in FIG. 5A are positions known to the control device 10.

FIG. 5B illustrates RSSIs concerning other device (the master device and slave devices) that are associated with a slave device identifier indicative of the slave device #1 in the RSSI table stored in the RSSI storage unit 142. In FIG. 5A, a circle having a radius corresponding to an RSSI concerning another device (the master device or another slave device) associated with the slave device identifier indicative of the slave device #1 is illustrated around the other device. Each circle corresponds to a position of the slave device #1 relative to another device that is estimated on the basis of an RSSI of a signal received from the other device by the slave device #1. Since an RSSI is a value indicative of an intensity of reception of a signal, a larger RSSI indicates a shorter distance between a device that has received a signal and a device that has transmitted the signal. Accordingly, a radius of each circle becomes smaller as a value of an RSSI becomes larger.

In FIG. 5A, the position of the slave device #1 matches a point at which a circle Vp1 around the master device having a radius corresponding to −60 dBm that is an RSSI concerning the master device, a circle V21 around the slave device #2 having a radius corresponding to −55 dBm that is an RSSI concerning the slave device #2, a circle V31 around the slave device #3 having a radius corresponding to −55 dBm that is an RSSI concerning the slave device #3, and a circle V41 around the slave device #4 having a radius corresponding to −55 dBm that is an RSSI concerning the slave device #4 cross one another.

In a case where the slave device #1 moves in any direction from the initial position, an RSSI of a signal received by the slave device #1 changes in accordance with a direction and a distance of movement from the initial position. That is, a difference between an RSSI of the slave device #1 at the initial position, i.e., an RSSI in the RSSI table stored in the RSSI storage unit 142 and an RSSI of the slave device #1 that has moved during execution of a mass performance, i.e., an RSSI in the RSSI list included in a latest response signal varies depending on the direction and distance of movement from the initial position. The slave device position estimating unit 17 estimates the position of the slave device #1 by comparing the RSSI in the RSSI table stored in the RSSI storage unit 142 and the RSSI in the RSSI table included in the latest response signal and thereby calculating a difference therebetween.

In FIG. 5C, a position of the slave device #1 that has moved from the initial position during execution of a mass performance is illustrated as a slave device #1-1. FIG. 5D illustrates a control signal C_p1 including a lighting-on command transmitted to the slave device #1 by the master device and a response signal R_1p transmitted to the master device in response to the control signal C_p1 by the slave device #1. An RSSI list of the slave device #1 is given to the response signal R_1p.

The slave device position estimating unit 17 compares an RSSI in the RSSI table stored in the RSSI storage unit 142 and the RSSI list given to the response signal R_1p and thereby calculates a difference therebetween. In FIG. 5D, the RSSI concerning the master device changes from −60 dBm to −65 dBm, and the RSSI concerning the slave device #3 changes from −55 dBm to −50 dBm. That is, the RSSI concerning the master device decreases by 5 dBm (increases by −5 dBm), and the RSSI concerning the slave device #3 increases by 5 dBm (decreases by −5 dBm). Since the RSSI concerning the slave device #2 and the RSSI concerning the slave device #4 have not changed, the difference is zero.

In this case, the slave device position estimating unit 17 estimates that the slave device #1 has moved away from the master device by a distance corresponding to an RSSI of 5 dBm and has moved toward the slave device #3 by a distance corresponding to an RSSI of 5 dBm and that a distance between the slave device #1 and the slave device #2 and a distance between the slave device #1 and the slave device #4 have not changed.

In FIG. 5C, the slave device position estimating unit 17 estimates that the position of the slave device #1 has moved from the position at which the circle Vp1, the circle V21, the circle V31, and the circle V41 cross one another to a point at which a circle Wp1 around the master device having a radius corresponding to −65 dBm that is an RSSI concerning the master device, the circle V21 (same as that in FIG. 5A) around the slave device #2 having a radius corresponding to −55 dBm that is an RSSI concerning the slave device #2, a circle W31 around the slave device #3 having a radius corresponding to −50 dBm that is an RSSI concerning the slave device #3, and a circle V41 (same as that in FIG. 5A) around the slave device #4 having a radius corresponding to −55 dBm that is an RSSI with the slave device #4 cross one another, i.e., the position of the slave device #1-1 in FIG. 5C. The slave device position estimating unit 17 updates the position of the slave device #1 on the basis of a result of the estimation.

Next, a processing flow of an initial position detection method executed in the control device 10 is described with reference to FIG. 6. FIG. 6 is a flowchart illustrating a processing flow of the initial position detection method according to the present embodiment.

The initial position detection method illustrated in FIG. 6 is executed before processing of a performance control method for controlling a mass performance that will be described later. The following describes, as an example, a method for detecting an initial position of a slave device # i (i is an integer in a range from 1 to n) among the slave devices #1 to # n.

In step S11, the initial position detection unit 15 transmits a control signal including a lighting-on command to the slave device # i through the communication unit 11.

In step S12, the initial position detection unit 15 receives a response signal to the control signal including the lighting-on command from the slave device # i through the communication unit 11.

In step S13, the initial position detection unit 15 gives the camera imaging unit 13 a command to execute imaging, and thereby the camera 12 images a range including the slave device # i. The camera 12 supplies a taken image to the initial position detection unit 15 through the camera imaging unit 13.

In step S14, the initial position detection unit 15 transmits a control signal including a lighting-off command to the slave device # i.

In step S15, the initial position detection unit 15 detects a position of the slave device # i by using the taken image acquired from the camera 12 through the camera imaging unit 13 and causes the detected position to be stored in the slave device position storage unit 141.

The initial position detection unit 15 detects coordinates of the slave device # i whose light-emitting unit 31 has been lighting on the taken image. Then, the initial position detection unit 15 detects absolute coordinates of the slave device # i on the basis of the correspondences between the coordinates on the taken image and absolute coordinates of the moving range of the slave devices #1 to # n based on the master device 20 that are associated in advance.

Next, in step S16, the initial position detection unit 15 causes an RSSI list given to the response signal received in step S12 to be stored in the RSSI storage unit 142.

Next, in step S17, the initial position detection unit 15 determines whether or not detection of positions of the slave devices #1 to # n has been finished.

In a case where detection of the positions of the slave devices #1 to # n has been finished (YES in step S17), the flow ends. In a case where detection of the positions of the slave devices #1 to # n has not been finished (NO in step S17), the flow returns to step S11, in which detection of a position of a slave device whose position has not been detected yet starts.

As described above, according to the processing flow illustrated in FIG. 6, the control device 10 can detect initial positions before execution of a mass performance, i.e., in a stage in which the slave devices #1 to # n can be lighting-on in any way.

In the initial position detection method illustrated in FIG. 6, the flow ends in a case where detection of the positions of the slave devices #1 to # n is finished. However, for example, the initial position detection method may be executed plural times before processing of the performance control method for controlling a mass performance. By executing the initial position detection method plural times, the positions of the slave devices #1 to # n are updated to a latest result, and the RSSI table of the RSSI storage unit 142 is updated to a latest result.

Figure 7:
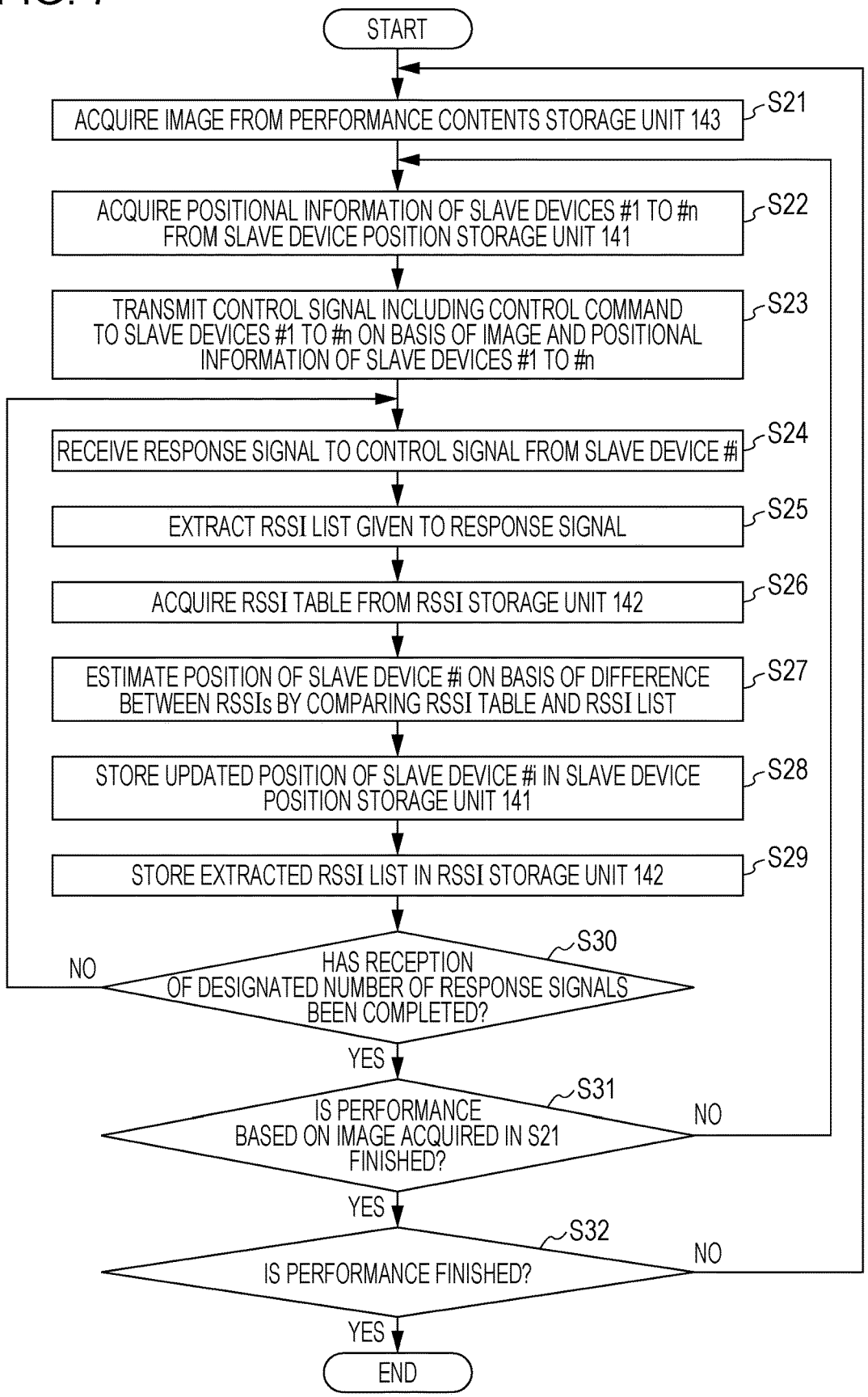
FIG. 7 is a flowchart illustrating a processing flow of a performance control method including a position estimation method according to the embodiment of the present disclosure.

Next, a processing flow of the performance control method including a position estimation method executed in the control device 10 is described with reference to FIG. 7. FIG. 7 is a flowchart illustrating a processing flow of the performance control method including the position estimation method according to the present embodiment.

The performance control method illustrated in FIG. 7 starts in a case where the control device 10 receives a command to start a mass performance from a user who executes the mass performance after execution of the initial position detection method illustrated in FIG. 6.

In step S21, the stage effect control unit 16 acquires an image of a performance from the performance contents storage unit 143.

In step S22, the performance control unit 16 acquires positional information of the slave devices #1 to # n as initial positions from the slave device position storage unit 141.

In step S23, the performance control unit 16 transmits a control signal including a control command to the slave devices #1 to # n through the communication unit 11 on the basis of the image acquired from the performance contents storage unit 143 and the positional information of the slave devices #1 to # n. The performance control unit 16 may transmit a control signal including a control command to a slave device(s) (a designated number of units) among the slave devices #1 to # n.

In step S24, the performance control unit 16 receives a response signal to the control command from each slave device # i (i is an integer in a range from 1 to n) through the communication unit 11. The performance control unit 16 supplies the received response signal to the slave device position estimating unit 17.

In step S25, the slave device position estimating unit 17 extracts an RSSI list added to the response signal.

In step S26, the slave device position estimating unit 17 acquires the RSSI table from the RSSI storage unit 142.

In step S27, the slave device position estimating unit 17 estimates a position of the slave device # i on the basis of a difference between an RSSI of the RSSI table and an RSSI of the RSSI list by comparing the RSSI table and the RSSI list.

In step S28, the slave device position estimating unit 17 causes the updated position of the slave device # i to be stored in the slave device position storage unit 141.

In step S29, the slave device position estimating unit 17 causes the extracted RSSI list to be stored in the RSSI storage unit 142.

In step S30, the performance control unit 16 determines whether or not reception of a designated number of response signals has been completed.

In a case where a designated number of response signals have not been received (NO in step S30), the flow returns to step S24, in which the performance control unit 16 receives a response signal from a slave device from which a response signal has not been received yet through the communication unit 11.

In a case where the designated number of response signals have been received (YES in step S30), the performance control unit 16 determines in step S31 whether or not to finish the mass performance based on the image acquired in step S21.

In a case where the mass performance based on the image acquired in step S21 is not finished (NO in step S31), the flow returns to step S22, and the mass performance based on the image acquired in step S21 is continued.

In a case where the mass performance based on the image acquired in step S21 is finished (YES in step S31), the performance control unit 16 determines in step S32 whether or not to finish a mass performance. For example, the performance control unit 16 determines whether or not to finish the mass performance on the basis of whether or not a command to end the mass performance has been received from the user who executes the mass performance.

In a case where the mass performance is not finished (NO in step S32), the flow returns to step S21, and the performance control unit 16 starts a next performance. In a case where the mass performance is finished (YES in step S32), the flow ends.

As described above, according to the processing flow illustrated in FIG. 7, the control device 10 can estimate a position of a slave device even during execution of a mass performance in which it is difficult to be lighting-on a slave device in any way. Therefore, even in a case where a position of a slave device is moved, it is possible to estimate the position of the slave device while avoiding a situation where the slave device is lighting-on in a way different from a mass performance. This makes it possible to execute a more mass performance effect.

Next, a processing flow of a control method executed in the slave device # i is described with reference to FIG. 8.

FIG. 8 is a flowchart illustrating a processing flow of a slave device according to the present embodiment.

The processing flow illustrated in FIG. 8 is a processing flow of a slave device that is common to both of a case where the initial position detection method illustrated in FIG. 6 is executed and a case where the performance control method illustrated in FIG. 7 is executed.

In step S41, the wireless communication unit 32 receives a signal. The signal received in step S41 is, for example, a control signal transmitted to any of the slave devices by the master device or a response signal transmitted to the master device by any of the slave devices. The wireless communication unit 32 supplies the received signal to the slave device control unit 35.

In step S42, the slave device control unit 35 determines whether or not a destination of the received signal is the slave device # i.

In a case where the destination of the received signal is the slave device # i (YES in step S42), the light emission control unit 33 controls a light-emitting state of the light-emitting unit 31 on the basis of a control command included in the signal in step S43.

In step S44, the slave device control unit 35 calculates an RSSI of the received signal.

In step S45, the slave device control unit 35 causes the calculated RSSI to be stored in the RSSI storage unit 34 as an "RSSI concerning the master device".

In step S46, the slave device control unit 35 acquires an RSSI list from the RSSI storage unit 34. The RSSI list acquired in step S46 includes the RSSI calculated in step S44.

In step S47, the slave device control unit 35 transmits, to the control device 10 through the master device 20, a response signal added to the RSSI list through the wireless communication unit 32. Then, the flow ends.

In a case where the destination of the received signal is a slave device # j that is not the slave device # i (NO in step S42), the slave device control unit 35 determines whether or not a transmission source of the received signal is the master device in step S48. Note that i and j are integers of 1 or more and are different from each other.

In a case where the transmission source of the received signal is the master device (YES in step S48), the slave device control unit 35 calculates an RSSI of the received signal in step S49.

In step S50, the slave device control unit 35 causes the calculated RSSI to be stored in the RSSI storage unit 34 as an "RSSI concerning the master device". Then, the flow ends.

In a case where the transmission source of the received signal is not the master device (NO in step S48), the slave device control unit 35 calculates an RSSI of the received signal in step S51. The case where the transmission source of the received signal is not the master device is, in other words, a case where the transmission source of the received signal is the slave device # j.

In step S52, the slave device control unit 35 causes the calculated RSSI to be stored in the RSSI storage unit 34 as an "RSSI concerning the slave device # j" that is the transmission source. Then, the flow ends.

As described above, according to the processing flow illustrated in FIG. 8, the slave device # i can calculate RSSIs indicative of positional relationships with the master device and the slave device # j by using the signal transmitted to the slave device # i by the master device, the signal transmitted to the slave device # j by the master device, and the signal transmitted to the master device by the slave device # j and notify the control device 10 about the RSSIs through the master device.

As described above, according to the present embodiment, the control device 10 can acquire, from each slave device (a light-emitting device or a wireless communication device), RSSIs indicative of positional relationships with the master device and other slave devices and estimate a direction and a distance of movement from an initial position on the basis of a change of the RSSIs and therefore can estimate a position of the slave device even during execution of a mass performance while avoiding light emission of the slave device for position detection.

Although an example in which a 2.4 GHz band wireless LAN is used as an example of wireless communication between the master device and the slave devices (the slave devices #1 to # n) has been described in the above embodiment, the present disclosure is not limited to this. Wireless communication between the master device and the slave devices (the slave devices #1 to # n) may be, for example, a 5 GHz band wireless LAN, Bluetooth Low Energy (BLE), 920 MHz band specified low power radio, or wireless communication of 60 GHz band Wireless Gigabit (WiGig).

Although an example in which a single master device is connected to the control device 10 in the control system 100 has been described in the above embodiment, two or more master devices may be connected to the control device 10.

Although an example in which positions of slave devices are detected one by one by lighting the slave devices one by one as the initial position detection method has been described in the above embodiment, the present disclosure is not limited to this. Positions of a plurality of slave devices may be detected by designating the plurality of slave devices to different light-emitting states (e.g., different colors, blinking of different cycles) and detecting the plurality of slave devices by performing image processing on an image of the slave devices of the different light-emitting states taken by a camera while distinguishing the plurality of slave devices.

Information on initial positions may be acquired from an external device instead of detecting the initial positions in the control device 10. For example, in a case where slave devices associated with audience seat positions (initial positions) are distributed to the spectator, detection of the initial positions can be omitted since the initial positions are associated with the slave devices in advance.

Although an example in which an RSSI is calculated as reception quality of a signal received by each slave device has been described in the above embodiment, the present disclosure is not limited to this. For example, each slave device may calculate a Signal to Noise Ratio (SNR) or a Signal to Interference plus Noise Ratio (SINR) of a received signal instead of an RSSI. The SNR or the SINR may be used as an index indicative of a positional relationship between a device that transmits a signal and a device that receives the signal as in the case of the RSSI.

Although various embodiments have been described above with reference to the drawings, the present disclosure is not limited to such examples. It is apparent to a person skilled in the art that various changes or modifications can be arrived at within the scope of the claims, and it is interpreted that such changes and modifications are encompassed within the technical scope of the present disclosure. Furthermore, the constituent elements in the above embodiment may be combined in any ways without departing from the spirit of the disclosure.

Although an example in which the present disclosure is realized by using hardware has been described in the above embodiment, the present disclosure can be realized by software in cooperation with hardware.

Each functional block used for description of the above embodiment is typically realized as an LSI, which is an integrated circuit. The integrated circuit may control each functional block used for description of the above embodiment and include an input and an output. These functional blocks may be individually realized as one chip or some or all of the functional blocks may be integrated into one chip. The name used here is LSI, but it may also be called IC, system LSI, super LSI, or ultra LSI depending on the degree of integration.

Furthermore, a method of integration is not limited to LSI, and integration may be realized by using a dedicated circuit or a general-purpose processor. A Field Programmable Gate Array (FPGA) that can be programmed after manufacturing an LSI or a reconfigurable processor that allows reconfiguration of the connection or setup of circuit cells inside the LSI may be used.

Furthermore, if a technique for integration that replaces LSI appears as a result of progress or derivation of a semiconductor technique, the functional blocks may be integrated by using the technique. Application of a biotechnology is one possibility.

SUMMARY OF PRESENT DISCLOSURE

A control device according to the present disclosure includes: a communication unit that transmits a first control signal for designating a first light-emitting state of first to n-th wireless communication devices to the first wireless communication device on a basis of a position of the first wireless communication device and transmits a second control signal for designating the first light-emitting state of the first to n-th wireless communication devices to the second wireless communication device on a basis of a position of the second wireless communication device, n being an integer of 2 or more, transmits a third control signal for designating a second light-emitting state of the first to n-th wireless communication devices to the first wireless communication device on a basis of the position of the first wireless communication device and transmits a fourth control signal for designating the second light-emitting state of the first to n-th wireless communication devices to the second wireless communication device on a basis of the position of the second wireless communication device after transmission of the first control signal and the second control signal, receives a first response signal to the first control signal from the first wireless communication device and receives a third response signal to the third control signal from the first wireless communication device after reception of the first response signal, receives a second response signal to the second control signal from the second wireless communication device and receives a fourth response signal to the fourth control signal from the second wireless communication device after reception of the second response signal; a storage unit in which positions of the first to n-th wireless communication devices, the first response signal, and the second response signal are stored; and a position estimating unit that updates the position of the first wireless communication device by using the first response signal and the third response signal, wherein the first response signal includes at least first reception quality calculated when the first control signal is received by the first wireless communication device and second reception quality of the second response signal calculated when the second response signal is received by the first wireless communication device, wherein the third response signal includes at least third reception quality calculated when the third control signal is received by the first wireless communication device and fourth reception quality of the fourth response signal calculated when the fourth response signal is received by the first wireless communication device, and wherein the position estimating unit updates the position of the first wireless communication device by using a difference between the first reception quality and the third reception quality and a difference between the second reception quality and the fourth reception quality.

The control device according to the present disclosure is arranged such that the communication unit transmits a fifth control signal for controlling a light-emitting state of a light-emitting unit of the first wireless communication device to a light-emitting state different from light-emitting units of the second to n-th wireless communication devices; and the control device includes: a camera imaging unit that acquires a first image capturing a region including the first wireless communication device whose light-emitting unit has been lighting on a basis of the fifth control signal; and a position detection unit that detects a position of the first wireless communication device on the basis of the first image.

The control device according to the present disclosure is arranged such that the communication unit transmits a sixth control signal for controlling a light-emitting state of the light-emitting unit of the second wireless communication device to a light-emitting state different from the light-emitting units of the first and third to n-th wireless communication devices, receives a fifth response signal to the fifth control signal from the first wireless communication device, and receives a sixth response signal to the sixth control signal from the second wireless communication device; the fifth response signal includes fifth reception quality calculated when the fifth control signal is received by the first wireless communication device and sixth reception quality calculated when the sixth response signal is received by the first wireless communication device; and the storage unit stores therein the fifth reception quality as the first reception quality and stores therein the sixth reception quality as the second reception quality.

The control device according to the present disclosure is arranged such that the first reception quality, the second reception quality, the third reception quality, and the fourth reception quality are received signal strength indicators (RSSI).

A wireless communication device of the present disclosure includes: a light-emitting unit; a wireless communication unit that receives a first control signal for designating a first light-emitting state of the light-emitting unit, transmits a first response signal to the first control signal, receives a third control signal for designating a second light-emitting state of the light-emitting unit, and transmits a third response signal to the third control signal; a light emission control unit that controls the first light-emitting state and the second light-emitting state of the light-emitting unit on a basis of a command included in the first control signal and a command included in the third control signal; and a control unit that calculates first reception quality of the first control signal and calculates third reception quality of the third control signal, wherein the wireless communication unit receives a second response signal to the first light-emitting state transmitted by another wireless communication device and receives a fourth response signal to the second light-emitting state transmitted by the other wireless communication device, wherein the control unit calculates second reception quality of the second response signal and fourth reception quality of the fourth response signal, wherein the first response signal includes at least the first reception quality and the second reception quality, and wherein the third response signal includes at least the second reception quality and the fourth reception quality.

A position estimation system according to the present disclosure includes: a control device; at least one wireless base station device connected to the control device; and first to n-th wireless communication devices wirelessly connected to any of the at least one wireless base station device, n being an integer of 2 or more, wherein the control device includes: a communication unit that transmits a first control signal for designating a first light-emitting state of the first to n-th wireless communication devices to the first wireless communication device on a basis of a position of the first wireless communication device and transmits a second control signal for designating the first light-emitting state of the first to n-th wireless communication devices to the second wireless communication device on a basis of a position of the second wireless communication device, transmits a third control signal for designating a second light-emitting state of the first to n-th wireless communication devices to the first wireless communication device on a basis of the position of the first wireless communication device and transmits a fourth control signal for designating the second light-emitting state of the first to n-th wireless communication devices to the second wireless communication device on a basis of the position of the second wireless communication device after transmission of the first control signal and the second control signal, receives a first response signal to the first control signal from the first wireless communication device and receives a third response signal to the third control signal from the first wireless communication device after reception of the first response signal, receives a second response signal to the second control signal from the second wireless communication device and receives a fourth response signal to the fourth control signal from the second wireless communication device after reception of the second response signal; a storage unit in which positions of the first to n-th wireless communication devices, the first response signal, and the second response signal are stored; and a position estimating unit that updates the position of the first wireless communication device by using the first response signal and the third response signal; wherein the first wireless communication device includes: a light-emitting unit; a wireless communication unit that receives the first control signal and the second response signal, transmits the first response signal, receives the third control signal and the fourth response signal, and transmits the third response signal; a light emission control unit that controls the first light-emitting state and the second light-emitting state of the light-emitting unit on a basis of a command included in the first control signal and a command included in the third control signal; and a control unit that calculates first reception quality of the first control signal, second reception quality of the second response signal, third reception quality of the third control signal, and fourth reception quality of the fourth response signal, wherein the first response signal includes at least the first reception quality and the second reception quality; wherein the third response signal includes at least the second reception quality and the fourth reception quality; and wherein the position estimating unit updates the position of the first wireless communication device by using a difference between the first reception quality and the third reception quality and a difference between the second reception quality and the fourth reception quality.

The present disclosure is applicable to a system that executes a mass performance using light-emitting devices.

What is claimed is:

1. A control device comprising:
a communication unit that
transmits a first control signal for designating a first light-emitting state of first to n-th wireless communication devices to the first wireless communication device based on a position of the first wireless communication device and transmits a second control signal for designating the first light-emitting state of the first to n-th wireless communication devices to the second wireless communication device based on a position of the second wireless communication device, n being an integer of 2 or more,
transmits a third control signal for designating a second light-emitting state of the first to n-th wireless communication devices to the first wireless communication device based on the position of the first wireless communication device and transmits a fourth control signal for designating the second light-emitting state of the first to n-th wireless communication devices to the second wireless communication device based on the position of the second wireless communication device after transmission of the first control signal and the second control signal,
receives a first response signal to the first control signal from the first wireless communication device and receives a third response signal to the third control signal from the first wireless communication device after reception of the first response signal,
receives a second response signal to the second control signal from the second wireless communication device and receives a fourth response signal to the fourth control signal from the second wireless communication device after reception of the second response signal;
a storage device in which positions of the first to n-th wireless communication devices, the first response signal, and the second response signal are stored; and
a position estimator that updates the position of the first wireless communication device by using the first response signal and the third response signal,
wherein the first response signal includes at least a first reception quality calculated when the first control signal is received by the first wireless communication device and a second reception quality of the second response signal calculated when the second response signal is received by the first wireless communication device,
wherein the third response signal includes at least a third reception quality calculated when the third control signal is received by the first wireless communication device and a fourth reception quality of the fourth response signal calculated when the fourth response signal is received by the first wireless communication device, and
wherein the position estimator updates the position of the first wireless communication device by using a difference between the first reception quality and the third reception quality and a difference between the second reception quality and the fourth reception quality.

2. The control device according to claim 1, wherein
the communication unit transmits a fifth control signal for controlling a light-emitting state of a light emitter of the first wireless communication device to a light-emitting state different from light emitters of the second to n-th wireless communication devices; and
the control device comprises:
   a camera imaging unit that acquires a first image capturing a region including the first wireless communication device whose light emitter has been lighting based on the fifth control signal; and
   a position detector that detects a position of the first wireless communication device based on the first image.

3. The control device according to claim 2, wherein
the communication unit transmits a sixth control signal for controlling a light-emitting state of the light emitter of the second wireless communication device to a light-emitting state different from the light emitters of the first and third to n-th wireless communication devices, receives a fifth response signal to the fifth control signal from the first wireless communication device, and receives a sixth response signal to the sixth control signal from the second wireless communication device;
the fifth response signal includes a fifth reception quality calculated when the fifth control signal is received by the first wireless communication device and a sixth reception quality calculated when the sixth response signal is received by the first wireless communication device; and
the storage device stores the fifth reception quality as the first reception quality and stores the sixth reception quality as the second reception quality.

4. The control device according to claim 1, wherein
the first reception quality, the second reception quality, the third reception quality, and the fourth reception quality are received signal strength indicators.

5. A control method comprising:
transmitting, by a communication unit, a first control signal for designating a first light-emitting state of first to n-th wireless communication devices to the first wireless communication device based on a position of the first wireless communication device, n being an integer of 2 or more;
transmitting, by the communication unit, a second control signal for designating the first light-emitting state of the first to n-th wireless communication devices to the second wireless communication device based on a position of the second wireless communication device;
transmitting, by the communication unit, a third control signal for designating a second light-emitting state of the first to n-th wireless communication devices to the first wireless communication device based on the position of the first wireless communication device;
transmitting, by the communication unit, a fourth control signal for designating the second light-emitting state of the first to n-th wireless communication devices to the second wireless communication device based on the position of the second wireless communication device after transmission of the first control signal and the second control signal;
receiving, by the communication unit, a first response signal to the first control signal from the first wireless communication device;
receiving, by the communication unit, a second response signal to the second control signal from the second wireless communication device;
receiving, by the communication unit, a third response signal to the third control signal from the first wireless communication device after reception of the first response signal;
receiving, by the communication unit, a fourth response signal to the fourth control signal from the second wireless communication device after reception of the second response signal;
storing, by a storage device, positions of the first to n-th wireless communication devices, the first response signal, and the second response signal; and
updating, by a position estimator, the position of the first wireless communication device by using the first response signal and the third response signal,
wherein the first response signal includes at least a first reception quality calculated when the first control signal is received by the first wireless communication device and a second reception quality of the second response signal calculated when the second response signal is received by the first wireless communication device,
wherein the third response signal includes at least a third reception quality calculated when the third control signal is received by the first wireless communication device and a fourth reception quality of the fourth response signal calculated when the fourth response signal is received by the first wireless communication device, and
wherein the position estimator updates the position of the first wireless communication device by using a difference between the first reception quality and the third reception quality and a difference between the second reception quality and the fourth reception quality.

6. The control method according to claim 5, further comprising:
transmitting, by the communication unit, a fifth control signal for controlling a light-emitting state of a light emitter of the first wireless communication device to a light-emitting state different from light emitters of the second to n-th wireless communication devices;
acquiring, by a camera imaging unit of the control device, a first image capturing a region including the first wireless communication device whose light emitter has been lighting based on the fifth control signal; and
detecting, by a position detector of the control device, a position of the first wireless communication device based on the first image.

7. The control method according to claim 6, further comprising:
transmitting, by the communication unit, a sixth control signal for controlling a light-emitting state of the light emitter of the second wireless communication device to a light-emitting state different from the light emitters of the first and third to n-th wireless communication devices;
receiving, by the communication unit, a fifth response signal to the fifth control signal from the first wireless communication device, wherein the fifth response signal includes a fifth reception quality calculated when the fifth control signal is received by the first wireless communication device and a sixth reception quality calculated when the sixth response signal is received by the first wireless communication device;

receiving, by the communication unit, a sixth response signal to the sixth control signal from the second wireless communication device;

storing, by the storage, the fifth reception quality as the first reception quality; and storing, by the storage, the sixth reception quality as the second reception quality.

8. The control device according to claim 5, wherein the first reception quality, the second reception quality, the third reception quality, and the fourth reception quality are received signal strength indicators.

* * * * *